(12) United States Patent
Kondo et al.

(10) Patent No.: US 10,384,348 B2
(45) Date of Patent: *Aug. 20, 2019

(54) ROBOT APPARATUS, METHOD FOR CONTROLLING THE SAME, AND COMPUTER PROGRAM

(71) Applicant: Sony Corporation, Tokyo (JP)

(72) Inventors: Genta Kondo, Kanagawa (JP); Atsushi Miyamoto, Kanagawa (JP); Satoru Shimizu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/938,466

(22) Filed: Mar. 28, 2018

(65) Prior Publication Data

US 2018/0215045 A1    Aug. 2, 2018

Related U.S. Application Data

(63) Continuation of application No. 15/359,939, filed on Nov. 23, 2016, now Pat. No. 9,962,839, which is a continuation of application No. 14/672,291, filed on Mar. 30, 2015, now Pat. No. 9,527,214, which is a continuation of application No. 13/776,763, filed on Feb. 26, 2013, now Pat. No. 8,996,176.

(30) Foreign Application Priority Data

Mar. 8, 2012    (JP) ................................ 2012-051629

(51) Int. Cl.
*B25J 9/16*    (2006.01)

(52) U.S. Cl.
CPC ... *B25J 9/1697* (2013.01); *G05B 2219/37555* (2013.01); *G05B 2219/39449* (2013.01); *G05B 2219/40099* (2013.01); *G05B 2219/40298* (2013.01); *G05B 2219/45108* (2013.01)

(58) Field of Classification Search
CPC ......... B25J 9/1697; G05B 2219/45108; G05B 2219/37555; G05B 2219/40099; G05B 2219/40298
USPC .......... 700/245, 257–259; 348/169; 901/1–4, 901/47, 30, 31, 46; 382/103, 153–155, 382/159, 173, 174, 190
See application file for complete search history.

(56) References Cited

U.S. PATENT DOCUMENTS 6,816,755 B2    11/2004    Habibi et al.
8,095,237 B2    1/2012    Habibi et al.
(Continued)

FOREIGN PATENT DOCUMENTS

CN    1293752 A    5/2001
JP    2009-214212 A    9/2009

*Primary Examiner* — Dalena Tran
(74) *Attorney, Agent, or Firm* — Wolf, Greenfield & Sacks, P.C.

(57) ABSTRACT

A robot apparatus includes an output unit that displays an image including an object on a screen, an input unit that receives an operation performed by a user for specifying information relating to an approximate range including the object in the image, an object extraction unit that extracts information regarding a two-dimensional contour of the object on the basis of the specification received by the input unit, and a position and attitude estimation unit that estimates information regarding a three-dimensional position and attitude of the object on the basis of the information regarding the two-dimensional contour.

20 Claims, 13 Drawing Sheets

(56) References Cited

U.S. PATENT DOCUMENTS

| | | |
|---|---|---|
| 8,447,863 B1 | 5/2013 | Francis, Jr. et al. |
| 8,781,629 B2 | 7/2014 | Ota |
| 8,996,176 B2 | 3/2015 | Kondo et al. |
| 9,044,856 B2 | 6/2015 | Nagasaka et al. |
| 9,527,214 B2 | 12/2016 | Kondo et al. |
| 2004/0172164 A1 | 9/2004 | Habibi et al. |
| 2006/0088203 A1* | 4/2006 | Boca .................. G06K 9/32 382/153 |
| 2006/0104788 A1 | 5/2006 | Ban et al. |
| 2006/0210112 A1* | 9/2006 | Cohen ............... G06K 9/00348 382/103 |
| 2008/0298672 A1 | 12/2008 | Wallack et al. |
| 2009/0033655 A1 | 2/2009 | Boca et al. |
| 2010/0179689 A1 | 7/2010 | Lin |
| 2010/0318224 A1 | 12/2010 | Okuda et al. |
| 2013/0138244 A1 | 5/2013 | Nagasaka et al. |
| 2013/0238131 A1 | 9/2013 | Kondo et al. |
| 2015/0202777 A1 | 7/2015 | Kondo et al. |
| 2017/0072569 A1 | 3/2017 | Kondo et al. |

* cited by examiner

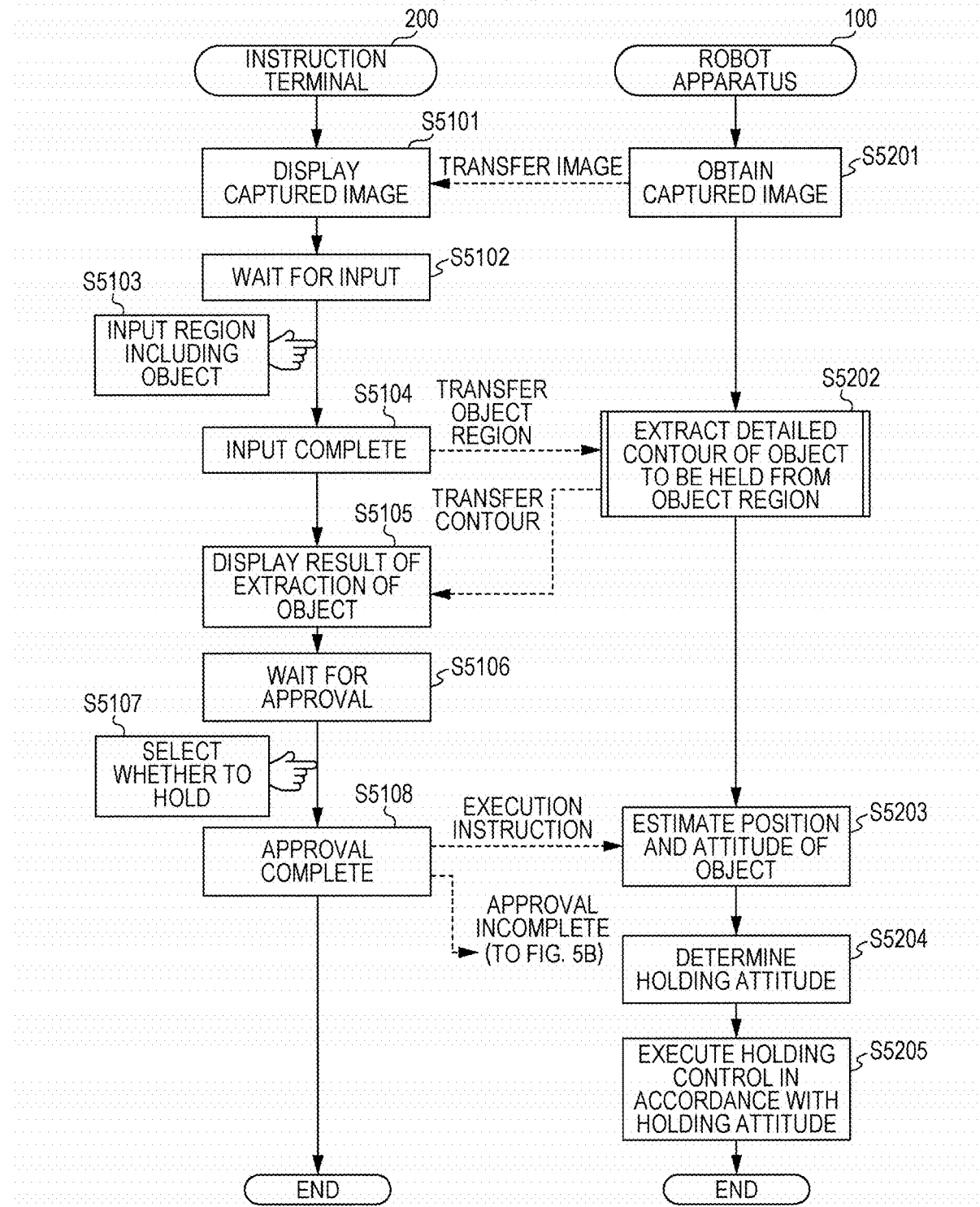

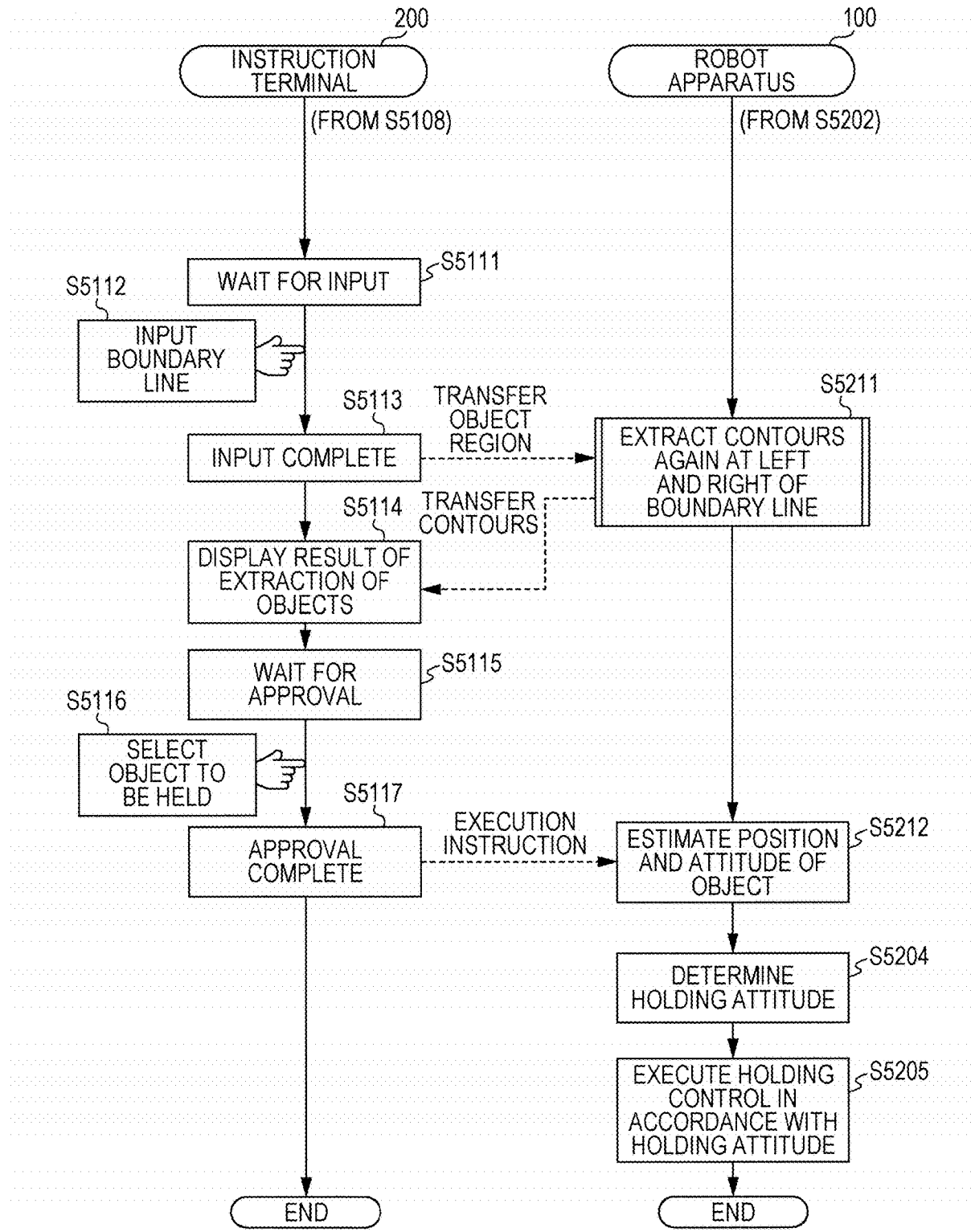

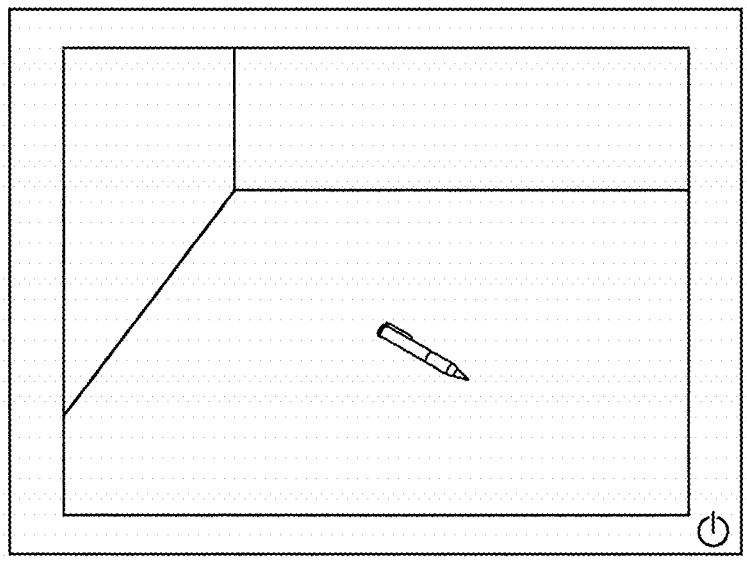

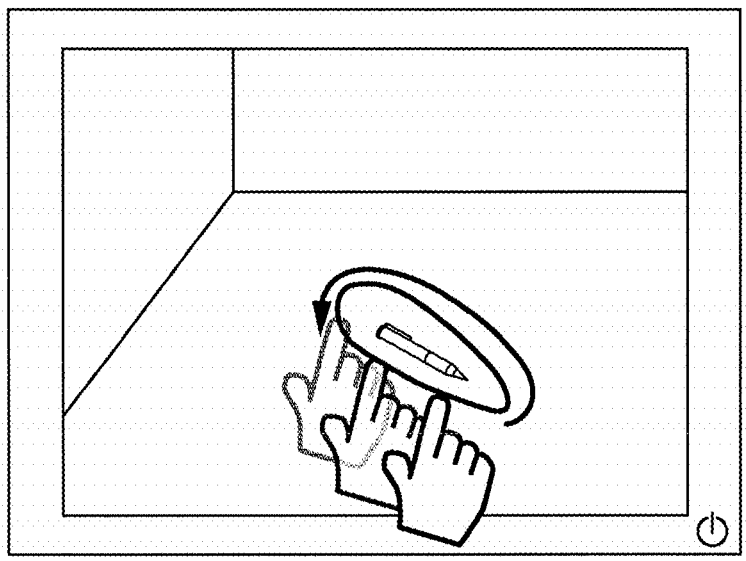
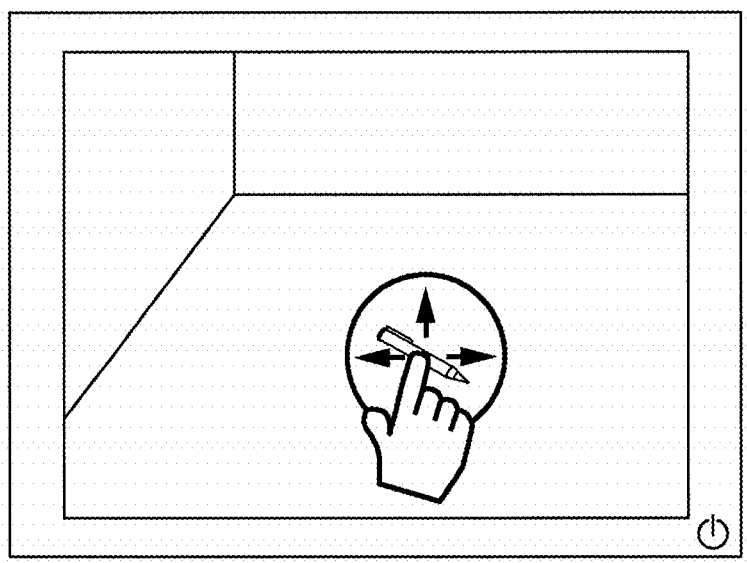

ROBOT APPARATUS, METHOD FOR CONTROLLING THE SAME, AND COMPUTER PROGRAM

CROSS REFERENCES TO RELATED APPLICATIONS

This application is a continuation of and claims the benefit under 35 U.S.C. § 120 of U.S. patent application Ser. No. 15/359,939, titled "ROBOT APPARATUS, METHOD FOR CONTROLLING THE SAME, AND COMPUTER PROGRAM," filed on Nov. 23, 2016, which is a continuation of and claims the benefit under 35 U.S.C. § 120 of U.S. patent application Ser. No. 14/672,291, titled "ROBOT APPARATUS, METHOD FOR CONTROLLING THE SAME, AND COMPUTER PROGRAM," filed on Mar. 30, 2015, which is a continuation of and claims the benefit under 35 U.S.C. § 120 of U.S. patent application Ser. No. 13/776,763, titled "ROBOT APPARATUS, METHOD FOR CONTROLLING THE SAME, AND COMPUTER PROGRAM," filed on Feb. 26, 2013, which claims the benefit under 35 U.S.C. § 119 of Japanese Patent Application JP 2012-051629, filed in the Japanese Patent Office on Mar. 8, 2012, each of which is hereby incorporated by reference in its entirety.

BACKGROUND

The present disclosure relates to a robot apparatus that recognizes an object in an environment and that holds the object, a method for controlling the robot apparatus, and a computer program, and, more particularly, to a robot apparatus that recognizes an object in an environment and performs a holding operation on the basis of an instruction from a user through an instruction terminal or the like, a method for controlling the robot apparatus, and a computer program.

Robot apparatuses are used in factories and the like. Most of such robot apparatuses are designed to achieve regular tasks. In these years, robot apparatuses that can perform various types of work are being realized. The latter robot apparatuses are applied, for example, to fields of welfare, nursing, and helping, and deliver desired objects to disabled people or the like in accordance with users' demands.

Here, in order to hold an object, a robot apparatus has an ability to recognize a target object in an environment. However, it is difficult for the robot apparatus to retain high recognition ability in various situations. In addition, when a minute object such as a needle or medicine (a pill) is to be held, it is difficult even to find such an object in an environment.

A control system is commonly used in the art in which a user uses an instruction terminal or the like to instruct the robot apparatus to perform an operation. Therefore, a method may be used in which the user informs, through the instruction terminal, the robot apparatus which object is to be held.

For example, an operation instruction system has been proposed in which holding patterns for a plurality of principal form models are stored in a database in advance, and when a user specifies a principal form model corresponding to an object to be held using an instruction terminal, the robot apparatus fits the specified principal form model into data regarding a three-dimensional position obtained for the object to be held and searches the database to select a holding pattern for the object to be held (for example, refer to Japanese Unexamined Patent Application Publication No. 2009-214212).

However, in the above-described operation instruction system, the database storing the principal form models is supposed to be prepared in advance, and it is difficult to treat objects that do not match the principal form models registered to the database. In addition, although data regarding the three-dimensional position of an object is obtained only by three-dimensional form measurement during fitting, the accuracy of the three-dimensional form measurement is generally low, and therefore an incorrect determination might be made and it is difficult to obtain data regarding a three-dimensional position that is sufficiently accurate to hold a minute object such as a needle or medicine (a pill), for which a principal form is difficult to define. Accordingly, the holding operation might not be effectively performed. In addition, an operation for selecting a principal form model using the instruction terminal is complex, and therefore it is possible that users even avoid using the operation instruction system.

SUMMARY

It is desirable to provide an effective robot apparatus that can recognize an object in an environment and properly perform a holding operation on the basis of an instruction from a user through an instruction terminal or the like, a method for controlling the robot apparatus, and a computer program.

It is also desirable to provide an effective robot apparatus that can recognize various objects including minute objects in an environment and properly perform a holding operation on the basis of a small number of instructions from the user, a method for controlling the robot apparatus, and a computer program.

In view of the above problems, a technology according to a first embodiment of the present disclosure is a robot apparatus including an output unit that displays an image including an object on a screen, an input unit that receives an operation performed by a user for specifying information relating to an approximate range including the object in the image, an object extraction unit that extracts information regarding a two-dimensional contour of the object on the basis of the specification received by the input unit, and a position and attitude estimation unit that estimates information regarding a three-dimensional position and attitude of the object on the basis of the information regarding the two-dimensional contour.

According to a technology according to a second embodiment of the present disclosure, the robot apparatus according to the first embodiment further includes an image pickup unit. The output unit displays an image captured by the image pickup unit on the screen.

According to a technology according to a third embodiment of the present disclosure, the robot apparatus according to the first embodiment further includes a holding unit, a holding planning unit that plans a trajectory of the holding unit for holding the object on the basis of the estimated information regarding the three-dimensional position and attitude of the object, and a holding control unit that controls a holding operation for the object performed by the holding unit in accordance with the planned trajectory.

According to a technology according to a fourth embodiment of the present disclosure, in the robot apparatus according to the first embodiment, a terminal device including the output unit and the input unit performs wireless communication with the robot apparatus including the holding unit.

According to a technology according to a fifth embodiment of the present disclosure, in the robot apparatus according to the first embodiment, the input unit is a touch panel integrated into the screen of the output unit. The user specifies the approximate range including the object by touching the touch panel.

According to a technology according to a sixth embodiment of the present disclosure, the robot apparatus according to the fifth embodiment is configured such that the user specifies the range including the object by drawing a region surrounding the object in the captured image displayed on the touch panel.

According to a technology according to a seventh embodiment of the present disclosure, the robot apparatus according to the fifth embodiment is configured such that the user specifies the range including the object by touching substantially a center of the range including the object in the captured image displayed on the touch panel, while providing a radius of the range using a period for which the user touches substantially the center of the range.

According to a technology according to an eighth embodiment of the present disclosure, the robot apparatus according to the fifth embodiment is configured such that the user specifies the range including the object by drawing a diagonal of a rectangular region surrounding the object in the captured image displayed on the touch panel.

According to a technology according to a ninth embodiment of the present disclosure, the robot apparatus according to the first embodiment is configured such that the output unit displays the information regarding the two-dimensional contour of the object extracted by the object extraction unit on the screen, and a holding operation for the object is performed when the user has approved the information regarding the two-dimensional contour through the input unit.

According to a technology according to a tenth embodiment of the present disclosure, the robot apparatus according to the ninth embodiment is configured such that, when the user has not approved the information regarding the two-dimensional contour, the input unit receives second specification from the user, and the object extraction unit extracts the information regarding the two-dimensional contour of the object again on the basis of the second specification.

According to a technology according to an eleventh embodiment of the present disclosure, the robot apparatus according to the tenth embodiment is configured such that the input unit receives the information relating to the approximate range including the object again as the second specification.

According to a technology according to a twelfth embodiment of the present disclosure, the robot apparatus according to the tenth embodiment is configured such that the input unit receives, as the second specification, additional specification for the approximate range including the object specified first.

According to a technology according to a thirteenth embodiment of the present disclosure, in the robot apparatus according to the tenth embodiment, the input unit receives, as the second specification, specification of a boundary line between a plurality of objects included in the approximate including the object specified first. The object extraction unit extracts information regarding two-dimensional contours of objects from both sides of the boundary line and the output unit displays the extracted information regarding the two-dimensional contours of the objects on the screen. The holding operation for the object is performed when the user has selected an object to be held and approved the information regarding the two-dimensional contours through the input unit.

A technology according to a fourteenth embodiment of the present disclosure is a method for controlling a robot apparatus. The method includes displaying an image including an object on a screen, receiving an operation performed by a user for specifying information relating to an approximate range including the object in the image, extracting information regarding a two-dimensional contour of the object on the basis of the specification received in the inputting, and estimating information regarding a three-dimensional position and attitude of the object on the basis of the information regarding the two-dimensional contour.

A technology according to a fifteenth embodiment of the present disclosure is a computer program described in a computer-readable form. The computer program causes a computer to function as an apparatus including an output unit that displays an image including an object on a screen, an input unit that receives an operation performed by a user for specifying information relating to an approximate range including the object in the image, an object extraction unit that extracts information regarding a two-dimensional contour of the object on the basis of the specification received by the input unit, and a position and attitude estimation unit that estimates information regarding a three-dimensional position and attitude of the object on the basis of the information regarding the two-dimensional contour.

The computer program according to the fifteenth embodiment of the present disclosure defines a computer program described in a computer-readable form in such a way as to realize certain processes on a computer. In other words, by installing the computer program according to the fifteenth embodiment of the present disclosure in the computer, a cooperative operation is realized on the computer, and the same operational effects as those of the robot apparatus according to the first embodiment of the present disclosure can be produced.

According to the technology disclosed herein, the robot apparatus can hold various objects on the basis of instructions from the user without registering such objects in advance. In particular, minute objects and thin objects, which are difficult to automatically recognize, can be recognized in an environment and the holding operation can be properly performed on the basis of a smaller number of times of specification by the user.

In addition, according to the technology disclosed herein, the user can inform the robot apparatus which object is to be held through a simple operation for specifying an approximate contour of an object using the instruction terminal, and therefore anyone can perform the specification operation simply and quickly.

In addition, according to the technology disclosed herein, even in the case of an object to be held that is difficult to recognize by a single process, the user can cause the robot apparatus to recognize the object to be held by repeatedly specifying a boundary line of the object to be held or the like for results recognized by mistake.

Other characteristics and advantages of the technology disclosed herein will become apparent from detailed description based on an embodiment that will be described later and the accompanying drawings.

BRIEF DESCRIPTION OF THE DRAWINGS

FIG. 5A is a diagram illustrating an example of a communication sequence of the control system at a time when the robot apparatus holds an object using instruction information from the instruction apparatus;

FIG. 5B is a diagram illustrating an example of the communication sequence of the control system at a time when the robot apparatus holds an object using the instruction information from the instruction apparatus;

FIG. 6 is a diagram illustrating an example of a captured image that has been obtained by the robot apparatus and that is displayed by the instruction terminal;

FIG. 7A is a diagram illustrating a state in which a user specifies an approximate range including a pen by drawing a region surrounding the pen, which is an object to be held, in the captured image displayed on a display screen of an output unit of the instruction terminal;

FIG. 7B is a diagram illustrating a state in which the user specifies an approximate range including the pen by keeping touching substantially the center of the pen, which is a holding target, in the captured image displayed on the display screen of the output unit of the instruction terminal;

DETAILED DESCRIPTION OF EMBODIMENTS

An embodiment of the technology disclosed herein will be described in detail hereinafter with reference to the drawings.

Figure 1:
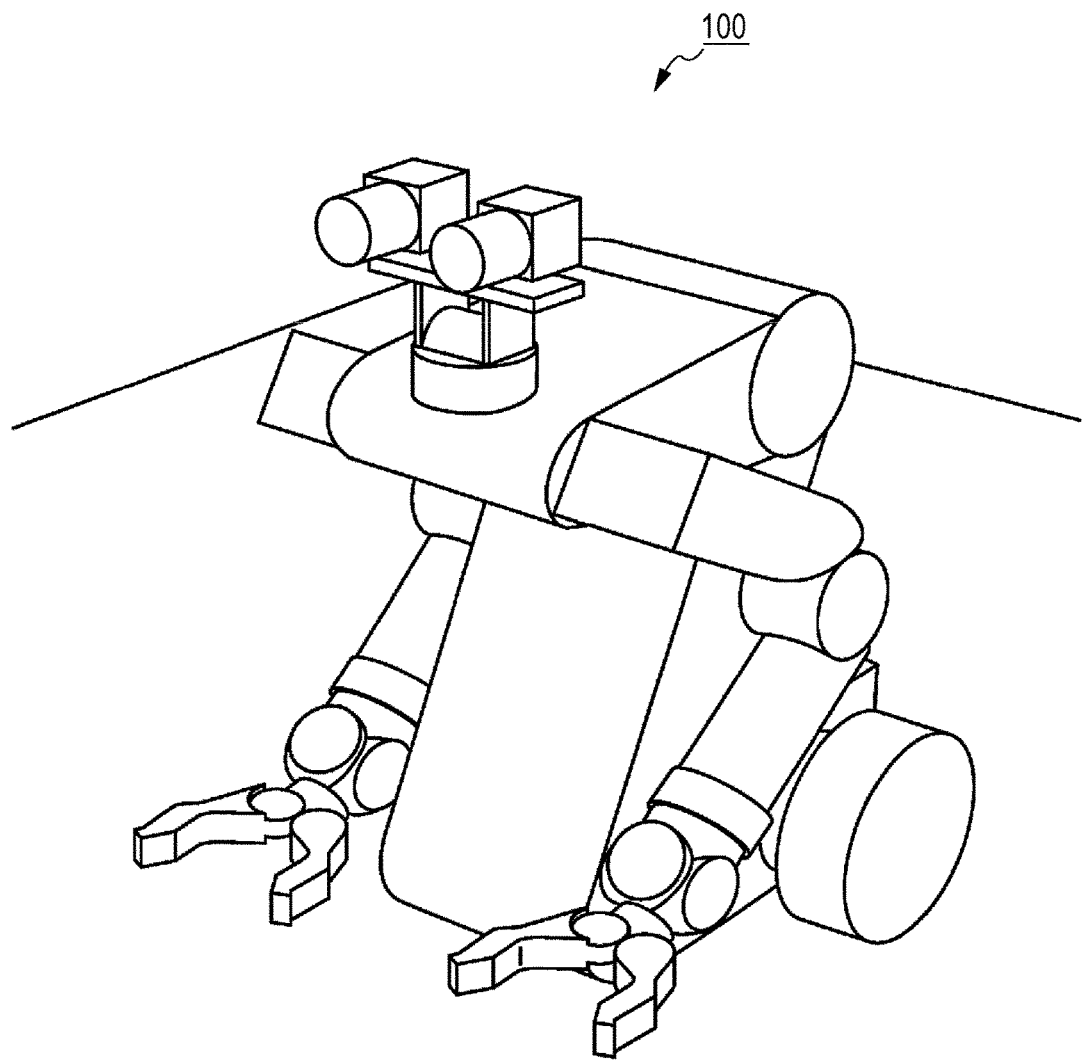
FIG. 1 is a diagram illustrating the appearance of a robot apparatus to which the technology disclosed herein can be applied.
Figure 2:
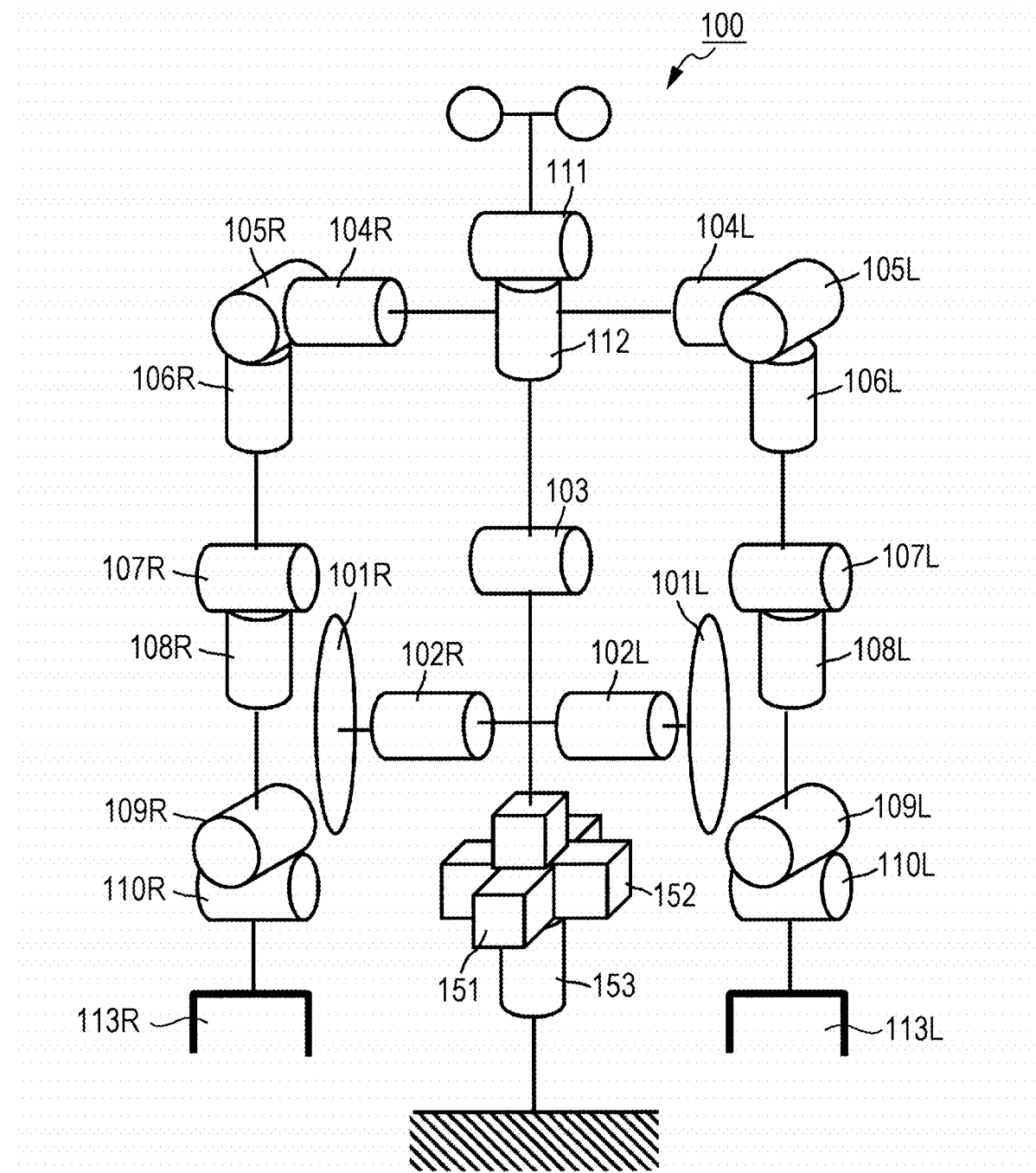
FIG. 2 is a diagram schematically illustrating the configuration of degrees of freedom of joints of the robot apparatus to which the technology disclosed herein can be applied.

FIG. 1 illustrates the appearance of a robot apparatus 100 to which the technology disclosed herein can be applied. The robot apparatus 100 has a link structure in which a plurality of parts are connected to one another by joints, and each joint is operated by an actuator. FIG. 2 schematically illustrates the configuration of degrees of freedom of the joints of the robot apparatus 100. The illustrated robot apparatus 100 is disposed in a surrounding environment that dynamically changes every moment, such as a home, and supports daily routine such as housework and nursing, but can be disposed in a factory or the like and perform regular tasks, instead.

The illustrated robot apparatus 100 is of a double-arm type, and includes two driven wheels 101R and 101L that face each other in a base portion as a movement unit. The driven wheels 101R and 101L are driven by driven wheel actuators 102R and 102L that rotate in a pitch direction. In FIG. 2, underactuated joints 151, 152, and 153 do not actually exist, and correspond to a translational degree of freedom in an X direction (longitudinal direction), a translational degree of freedom in a Y direction (lateral direction), and a rotational degree of freedom in a yaw direction, respectively, of the robot apparatus 100 relative to a floor surface. The underactuated joints 151, 152, and 153 represent movement of the robot apparatus 100 in a virtual world.

The movement unit is connected to an upper body through a lumbar joint. The lumbar joint is driven by a lumbar joint pitch axis actuator 103 that rotates in the pitch direction. The upper body includes left and right arm units and a head unit connected through a neck joint. The left and right arm units each include a shoulder joint having three degrees of freedom, an elbow joint having two degrees of freedom, and a wrist joint having two degrees of freedom, that is, the left and right arm units each have a total of seven degrees of freedom. The shoulder joints, which each have three degrees of freedom, are driven by shoulder joint pitch axis actuators 104R and 104L, shoulder joint roll axis actuators 105R and 105L, and shoulder joint yaw axis actuators 106R and 106L. The elbow joints, which each have two degrees of freedom, are driven by elbow joint pitch axis actuators 107R and 107L and elbow joint yaw axis actuators 108R and 108L. The wrist joints, which each have two degrees of freedom, are driven by wrist joint roll axis actuators 109R and 109L and wrist joint pitch axis actuators 110R and 110L. The neck joint, which has two degrees of freedom, is driven by a neck joint pitch axis actuator 111 and a neck joint yaw axis actuator 112. Hand joints, which are provided at ends of the left and right arm units and each has one degree of freedom, are driven by hand joint roll axis actuators 113R and 113L. In the present embodiment, an object can be held by hands of the robot apparatus 100 by driving the hand joint roll axis actuators 113R and 113L.

Although the illustrated robot apparatus 100 includes the movement unit configured by the two wheels that face each other, the scope of the technology disclosed herein is not limited to the movement unit configured by the two wheels that face each other. For example, the technology disclosed herein may also be applied to a robot apparatus that includes a movement unit of a leg type or a robot apparatus that does not include a movement unit.

The actuators along each axis each include an encoder for measuring a joint angle, a motor for generating torque, a current-control motor driver for driving the motor, and a speed reducer for obtaining sufficient generative force. In addition, each actuator is provided with a control microcomputer for performing drive control thereof (none of the foregoing is illustrated in FIG. 2).

Calculation of the dynamics of the robot apparatus 100 is executed by, for example, a host computer (not illustrated), and a control target value of the torque or the joint angle of each joint actuator is generated. The control target values are transmitted to the control microcomputers provided for the actuators and used for the control of the actuators executed by the control microcomputers. In addition, each joint actuator is controlled using a force control method or a position control method.

Figure 3:
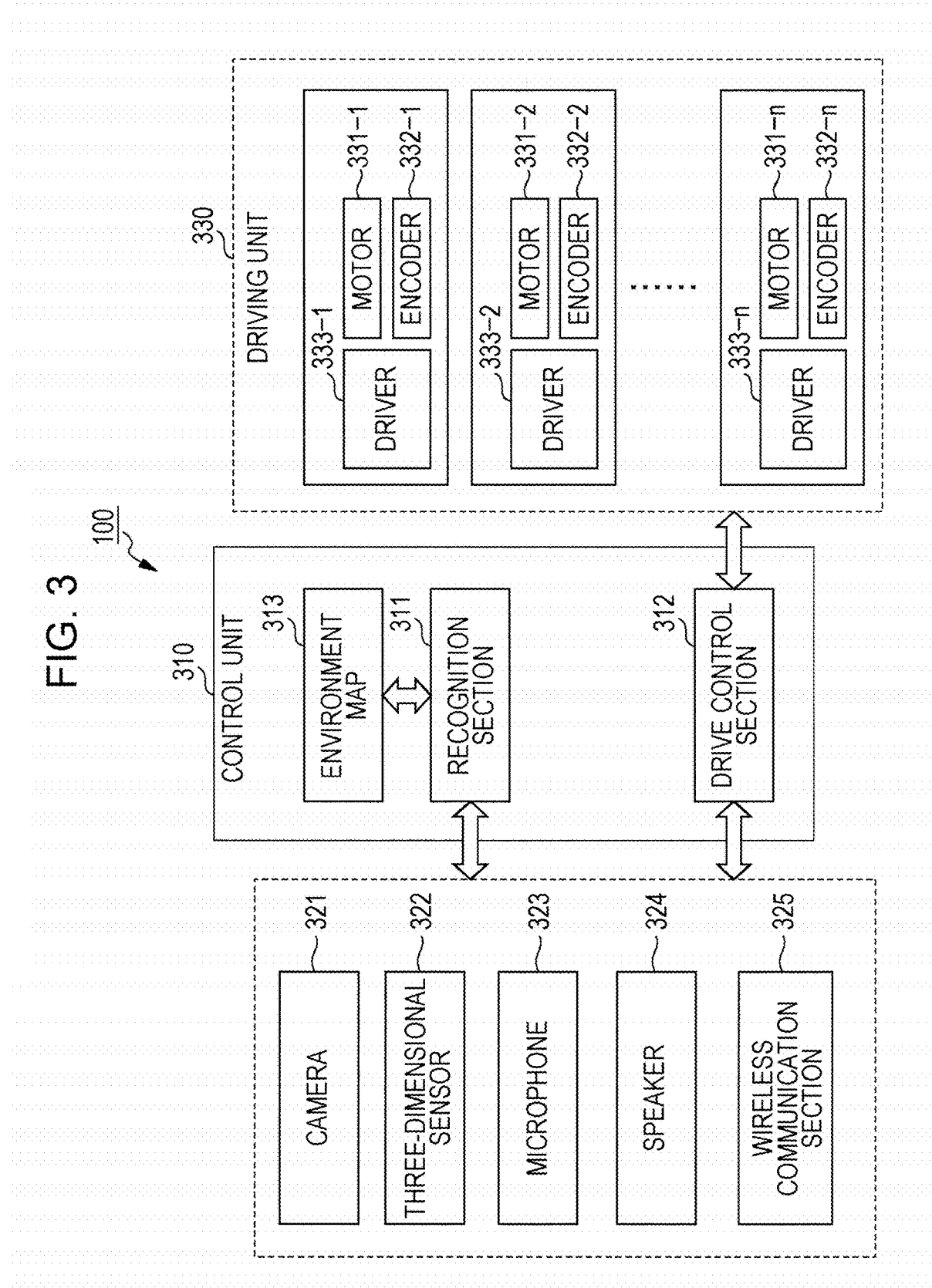
FIG. 3 is a diagram schematically illustrating the configuration of a control system of the robot apparatus illustrated in FIG. 1.

FIG. 3 schematically illustrates the configuration of a control system of the robot apparatus 100 illustrated in FIG. 1. The robot apparatus 100 includes a control unit 310 that executes integrated control of the overall operation and other types of data processing, an input/output unit 320, and a driving unit 330. Each component will be described hereinafter.

The input/output unit 320 includes a camera 321 corresponding to an eye of the robot apparatus 100, a three-dimensional sensor 322, and a microphone 323 corresponding to an ear of the robot apparatus 100 as input sections. The input/output unit 320 includes a speaker 324 corresponding to a mouth of the robot apparatus 100 as an output section. Here, the camera 321 includes an image detection device such as a charge-coupled device (CCD) or a complementary metal-oxide-semiconductor (CMOS) device. The three-dimensional sensor 322 is a device capable of measuring the three-dimensional position and attitude of an object, and is configured by, for example, a stereo camera, a laser rangefinder, Kinect (registered trademark), or the like. The robot apparatus 100 can receive an input of a task through, for example, audio input from a user using the microphone 323. However, the robot apparatus 100 may include another input section (not illustrated) that receives an input of a task through wired communication, wireless communication, a recording medium, or the like.

The input/output unit 320 includes a wireless communication section 325. The robot apparatus 100 can perform data communication with an instruction terminal (a tablet terminal or the like; not illustrated in FIG. 3) of the user through a communication path such as Wi-Fi (registered trademark) using the wireless communication section 325.

The driving unit 330 is a function module for realizing the degrees of freedom of the joints of the robot apparatus 100, and includes a plurality of driving sections provided for axes, namely a roll axis, a pitch axis, and a yaw axis, of the joints. Each driving section is configured to include a combination between a motor 331 that performs a rotation operation along a certain axis, an encoder 332 that detects the rotational position of the motor 331, and a driver 333 that adaptively controls the rotational position and the rotational speed of the motor 331 on the basis of an output of the encoder 332.

The control unit 310 includes a recognition section 311, a drive control section 312, and an environment map 313.

The recognition section 311 recognizes the surrounding environment on the basis of information obtained from the input sections of the input/output unit 320, such as the camera 321 and the three-dimensional sensor 322. For example, the recognition section 311 creates and updates the environment map 313 on the basis of information regarding the position and the attitude of the camera 321 obtained by a process for estimating a position that estimates the position of the camera 321 and information regarding an object obtained by a process for recognizing an image that detects an object from an image captured by the camera 321.

The drive control section 312 controls the output section of the input/output unit 320 and the drive of the driving unit 330. For example, the drive control section 312 controls the driving unit 330 such that the robot apparatus 100 realizes a task. Tasks realized by the robot apparatus 100 include physical interactions with the user such as a delivery of an object specified by the user, and the driven wheel actuators 102R and 102L and the joint actuators of the arm units are driven to realize the interactions.

The robot apparatus 100 is applied to, for example, support of daily routine, and delivers a desired object to a disabled person or the like in accordance with the user's demand. Here, in order to hold an object, the robot apparatus 100 has an ability to recognize a target object in an environment. In the present embodiment, an ability to hold minute objects and thin objects, which are difficult to recognize by three-dimensional shape measurement, is realized by using a method in which the user specifies an approximate range including an object shown in a camera image for the robot apparatus 100.

Figure 4:
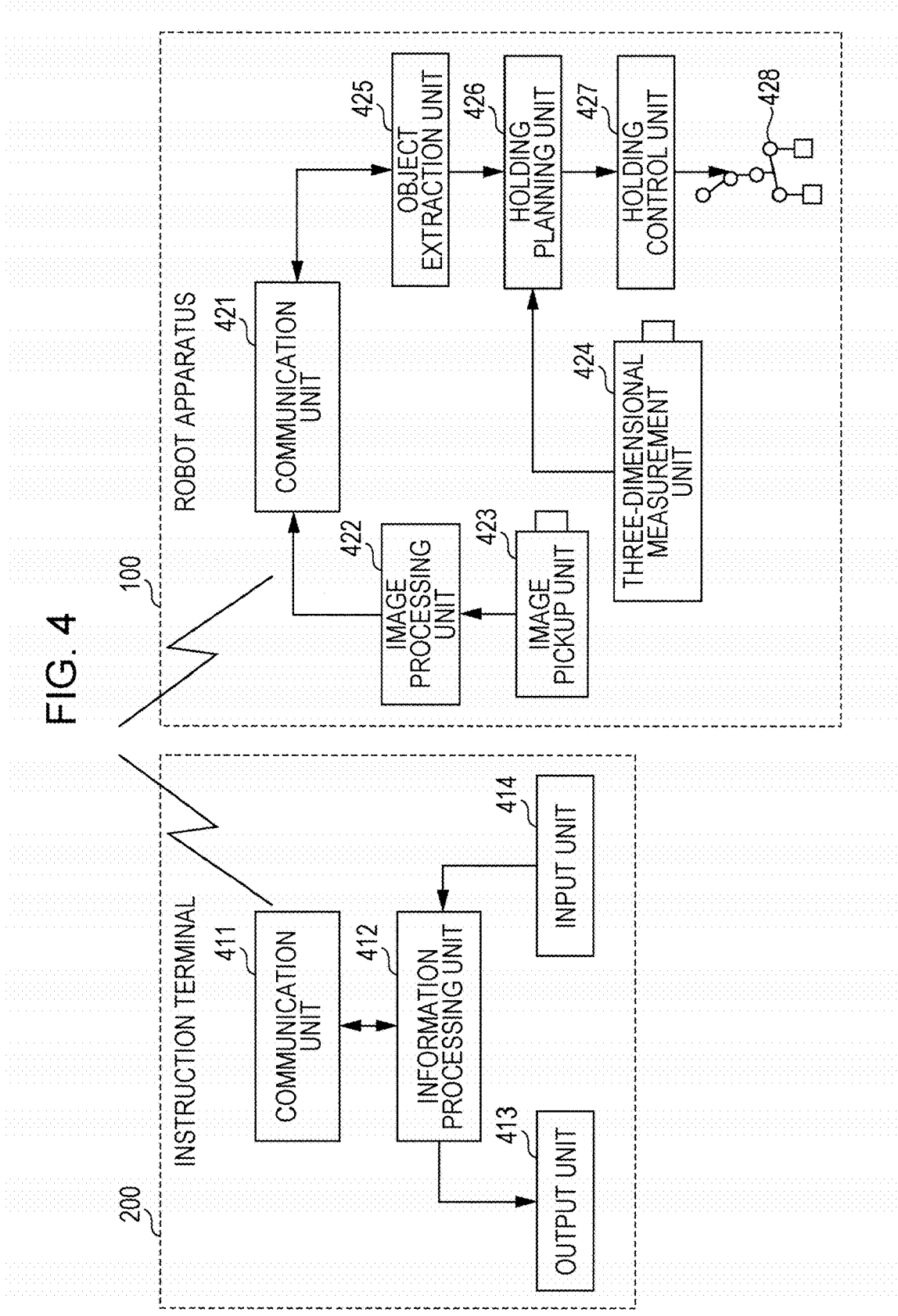
FIG. 4 is a diagram schematically illustrating the functional configuration of a control system including the robot apparatus and an instruction terminal.

FIG. 4 illustrates the functional configuration of a control system including the robot apparatus 100 and an instruction terminal 200.

The instruction terminal 200 includes a communication unit 411, an information processing unit 412, an output unit 413, and an input unit 414.

The communication unit 411 can perform data communication with the robot apparatus 100 or the like through a communication path such as Wi-Fi.

When the instruction terminal 200 is a tablet terminal, the output unit 413 is a flat display device such as a liquid crystal display (LCD), and the input unit 414 is a touch panel integrated into a display screen of the output unit 413. The user can perform an input operation by touching the display screen with his/her finger or a pen.

The information processing unit 412 performs processing using an operating system and communicates information between the communication unit 411 and the input unit 414 or the output unit 413.

In the robot apparatus 100, a communication unit 421 corresponds to the wireless communication section 325, an image pickup unit 423 corresponds to the camera 321, and a three-dimensional measurement unit 424 corresponds to the three-dimensional sensor 322. An image processing unit 422 corresponds to the recognition section 311 of the control unit 310, and a holding planning unit 426 and a holding control unit 427 correspond to the drive control section 312. A holding unit 428 is mainly configured by two arms of the robot apparatus 100.

At least one camera may be mounted as the image pickup unit 423. When two cameras are mounted, as described later, specification using left and right images can be performed using the instruction terminal 200. The camera as the image pickup unit 423 does not have to be mounted on the robot apparatus 100, and may be an environment camera that is disposed outside the robot apparatus 100 and that captures images of a work environment. However, a relationship between a camera coordinate system and a world coordinate system is supposed to be determined regardless of whether or not the camera is mounted on the robot apparatus 100.

The control system illustrated in FIG. 4 converts the camera coordinate system into the world coordinate system in order to estimate the position and the attitude of a target object to be held in an image captured by the camera. In the following description, the relationship between the two coordinate systems is assumed to be determined.

In the robot apparatus 100, the image pickup unit 423 captures an image of the environment. The captured image is obtained by the image processing unit 422 and then transferred to the instruction terminal 200 through the communication unit 421. In the instruction terminal 200, the user specifies, through the input unit 414, an approximate range including an object to be held in the captured image displayed on the output unit 413. This specification information is transferred to the robot apparatus 100 through the communication unit 411. In the robot apparatus 100, the object extraction unit 425 extracts a detailed contour of the object to be held in the range indicated by the specification information. The holding planning unit 426 determines the attitude of the object to be held on the basis of a result of the measurement performed by the three-dimensional measurement unit 424, and plans the trajectories of the arm units for holding the object in that attitude. Thereafter, the holding control unit 427 controls the operation of the holding unit 428 in accordance with the planned trajectories to realize the holding of the object.

The three-dimensional measurement unit 424 is configured by, for example, a stereo camera, a laser rangefinder, Kinect, or the like, and the measurement accuracy of the three-dimensional measurement unit 424 is generally low. In the present embodiment, by using two-dimensional contour information extracted by the object extraction unit 425 on the basis of the specification information, the accuracy of estimating the three-dimensional position and attitude of an object can be improved.

Alternatively, the robot apparatus 100 may feed back, to the instruction terminal 200, the contour information regarding an object to be held extracted on the basis of first specification from the instruction terminal 200 that specifies an approximate range including the object. In this case, in the instruction terminal 200, the extracted contour of the object is displayed on the output unit 413. After approving the contour of the object, the user instructs, through the instruction terminal 200, the robot apparatus 100 to hold the object. In the robot apparatus 100, in response to the instruction to hold the object, the holding planning unit 426 estimates the three-dimensional position and attitude of the object to be held, and plans the trajectories of the arm units to hold the object in that attitude. The holding control unit 427 realizes the holding of the object in accordance with the planned trajectories.

On the other hand, if the user does not approve the contour of the object extracted on the basis of the first specification, the user performs second specification to identify the object to be held. An example of a case in which it is difficult to extract the contour of the object on the basis of the first specification, which specifies an approximate range including the object to be held is a case in which an object other than the object to be held is included in the specified range. Therefore, the user specifies, as the second specification, a boundary line between the objects in the contour extracted by the robot apparatus 100. This specification information is transferred to the robot apparatus 100 through the communication unit 411. In the robot apparatus 100, the object extraction unit 425 extracts contours of objects again at the left and right of the specified boundary line, and feeds contour information regarding the left and right objects back to the instruction terminal 200. Thereafter, in the robot apparatus 100, upon receiving an instruction issued by the user to hold the object from the instruction terminal 200, the holding planning unit 426 determines the three-dimensional position and attitude of the object to be held, and plans the trajectories of the arm units to hold the object in that attitude. The holding control unit 427 realizes the holding of the object in accordance with the planned trajectories.

In the control system illustrated in FIG. 4, the instruction terminal 200 may be considered as a part of the robot apparatus 100. In addition, although the instruction terminal 200 is separated from the robot apparatus 100 and configured as a terminal apparatus connected to the robot apparatus 100 through wireless communication in FIG. 4, an "instruction unit" having the same function as the instruction terminal 200 may be integrated into the robot apparatus 100, instead.

FIG. 5A illustrates an example of a communication sequence of the control system at a time when the robot apparatus 100 holds an object using specification information from the instruction terminal 200.

Upon receiving an image captured by the image pickup unit 423 thereof (S5201), the robot apparatus 100 transfers the image to the instruction terminal 200 through the communication unit 421.

In the instruction terminal 200, when the communication unit 411 has received the image transferred from the robot apparatus 100, the output unit 413 displays the image on the display screen (S5101). FIG. 6 illustrates an example of the captured image that has been obtained by the robot apparatus 100 and that is displayed on the display screen of the output unit 413. A captured image of a pen, which is an object to be held, on a floor is the example illustrated in FIG. 6.

The instruction terminal 200 waits for an input from the user to the input unit 414 while displaying the captured image received from the robot apparatus 100 (S5102).

The user can input an instruction regarding the object to be held through, for example, the input unit 414, which is the touch panel integrated into the display screen of the output unit 413. In the present embodiment, an operation is assumed in which the user specifies an approximate range including the object to be held in the displayed captured image.

Here, there are some methods for enabling the user to specify an approximate range including the object on the touch panel.

FIG. 7A illustrates a state in which the user specifies an approximate range including the pen by drawing a region surrounding the pen, which is the holding target, in the captured image displayed on the display screen of the output unit 413 of the instruction terminal 200. In this case, information regarding a segment drawn by the user's finger on the touch panel is the specification information indicating the region of the object.

FIG. 7B illustrates a state in which the user specifies an approximate range including the pen by keeping touching substantially the center of the range including the pen, which is the object to be held. While the user keeps touching substantially the center of the range, a circular region (the radius of a circle) having a point touched by the user's finger as its center gradually enlarges on the display screen. In this case, information regarding the coordinates of the center of the region touched by the user on the touch panel and the radius of the region calculated on the basis of a time at which the user began to touch the region is the specification information indicating the region of the object. Therefore, the user may release his/her finger from the touch panel when the size of the circular region becomes desirable to include the pen.

Figure 7C:
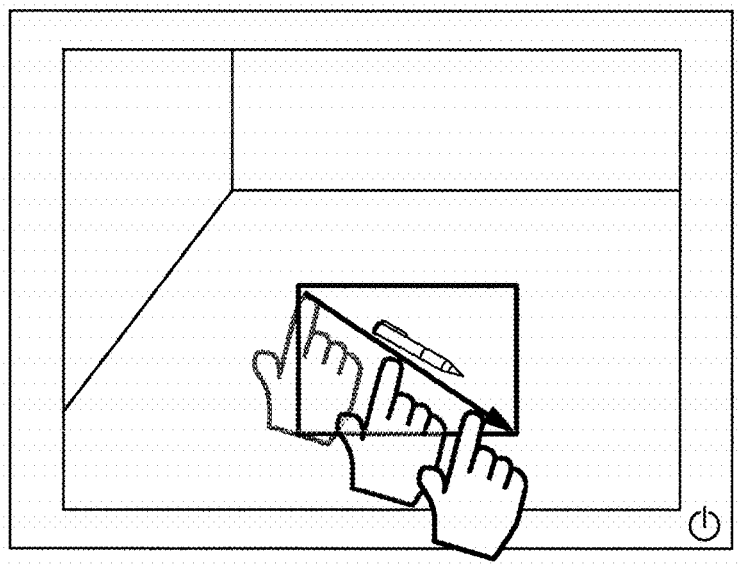
FIG. 7C is a diagram illustrating a state in which the user specifies an approximate range including the pen by drawing a diagonal of a rectangular region surrounding the pen, which is the object to be held, in the captured image displayed on the display screen of the output unit of the instruction terminal.

FIG. 7C illustrates a state in which the user specifies an approximate range including the pen by drawing a diagonal of a rectangular region surrounding the pen, which is the object to be held, in the captured region. In this case, information regarding the coordinates of points at ends of the diagonal drawn by the user is the specification information indicating the region of the object.

Figure 7D:
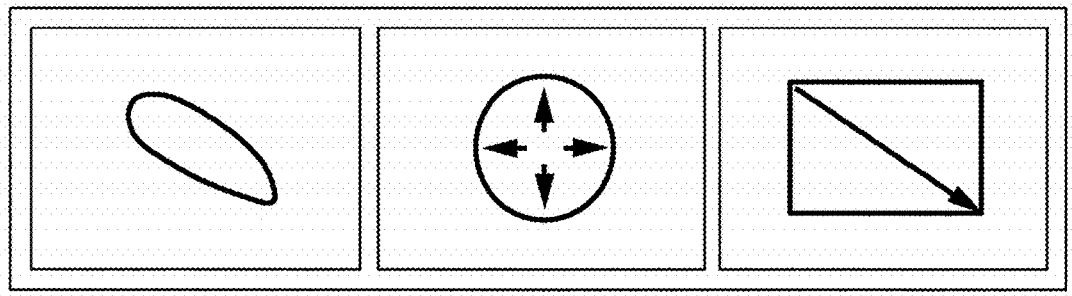
FIG. 7D is a diagram illustrating a palette for selecting an input method including icons representing input methods illustrated in FIGS. 7A to 7C.

One of the input methods illustrated in FIGS. 7A to 7C may be used in the instruction terminal 200, but the user may arbitrarily select an input method by using a palette including icons representing the input methods as illustrated in FIG. 7D.

For example, when the user has performed, one of the operations illustrated in FIGS. 7A to 7C (S5103) and input the specification information indicating the region of the object to the input unit 414 (S5104), the instruction terminal 200 transfers the specification information to the robot apparatus 100 through the communication unit 411.

In the robot apparatus 100, upon receiving the specification information indicating the approximate region including the object to be held, the object extraction unit 425 extracts a detailed contour of the object to be held from the specified region (S5202). The method for extracting the contour of the object is not particularly limited. For example, a method disclosed in a publicly available document "'GrabCut'—Interactive Foreground Extraction using Iterated Graph Cuts", Microsoft Research Cambridge 04, may be used.

Figure 8A:
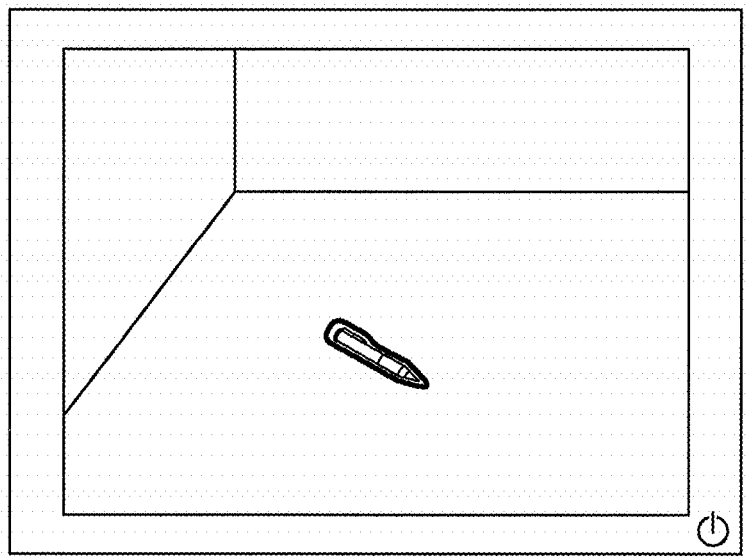
FIG. 8A is a diagram illustrating a state in which a detailed contour of the object to be held extracted in a region specified by the user is superimposed upon the captured image displayed on the display screen.
Figure 8B:
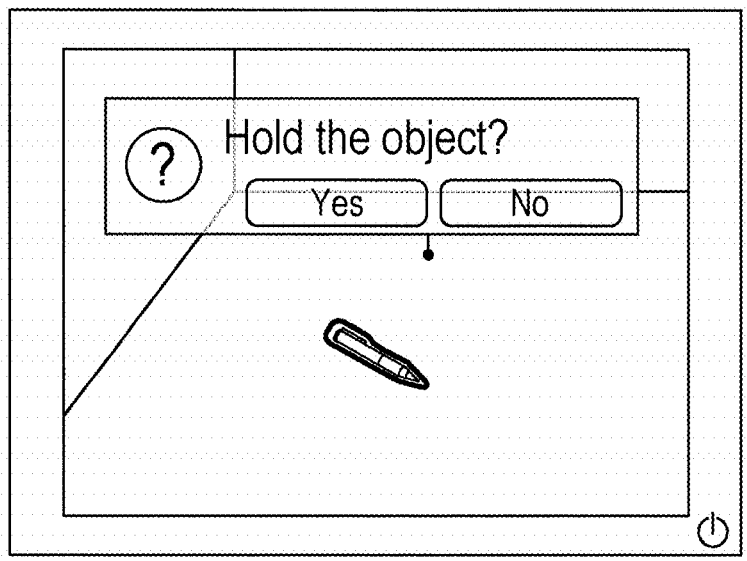
FIG. 8B is a diagram illustrating a dialog box for determining whether to perform a holding operation on the object to be held on the basis of displayed contour information.

The robot apparatus 100 transfers the contour information regarding the object to be held estimated in S5202 to the instruction terminal 200 through the communication unit 421 along with the captured image. In the instruction terminal 200, the output unit 413 displays the transferred contour of the object to be held on the display screen thereof (S5105). FIG. 8A illustrates a state in which the detailed contour of the object to be held extracted in the region specified by the user is superimposed upon the captured image displayed on the display screen. The instruction terminal 200 then waits until the user determines whether to hold the object to be held using this contour (S5106). As illustrated in FIG. 8B, a dialog box for determining whether or not the user approves or permits the holding operation performed by the robot apparatus 100 is displayed on the display screen on which the detailed contour of the object to be held is displayed by the output unit 413. In the illustrated dialog box, a message "Hold the object?" is displayed along with buttons "Yes" and "No".

In the instruction terminal 200, if the user approves the detailed contour of the object extracted by the robot apparatus 100 by, for example, selecting "Yes" in the dialog box (S5108), the instruction terminal 200 instructs the robot apparatus 100 to hold the object to be held through the communication unit 411.

In the robot apparatus 100, when the communication unit 421 has received the execution instruction, the holding planning unit 426 estimates the position and the attitude of the object to be held from the extracted contour on the basis of the relationship between the camera coordinate system and the world coordinate system of the image pickup unit 423 (S5203). However, details of a process for estimating the position and the attitude of the object to be held will be described later.

Next, the holding planning unit 426 determines the attitude of the holding unit 428 at a time when the holding unit 428 holds the object to be held on the basis of the position and the attitude of the object to be held estimated in S5203 (S5204). Any method may be used to determine the attitude of the holding unit 428 at a time when the holding unit 428 holds the object to be held. For example, a method disclosed in Japanese Patent Application No. 2011-262202, which has already been transferred to the present applicant, may be used.

Next, the holding control unit 427 controls the operation of the holding unit 428 in accordance with the trajectories planned by the holding planning unit 426 and realizes the holding of the object (S5205). Any method may be used to control the operation of the holding unit 428 in accordance with the determined holding attitude. For example, a method disclosed in Japanese Patent Application No. 2011-262202, which has already been transferred to the present applicant, may be used.

On the other hand, if there is a problem in the contour of the object extracted by the robot apparatus 100 and the user selects "No" in the dialog box illustrated in FIG. 8B, one of the following two methods may be used as a subsequent process. One is a method in which the instruction terminal 200 returns to the processing in S5103 and the user specifies an approximate range including the object again. The other is a method in which the user performs the second specification using the information regarding the first specification.

Figure 9:
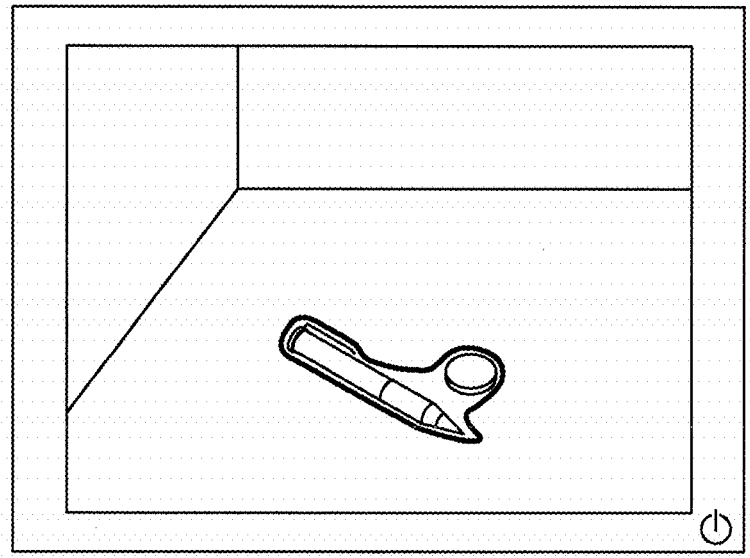
FIG. 9 is a diagram illustrating an extracted contour that includes the pen, which is the object to be held, and, by mistake, an eraser beside the pen.
Figure 10:
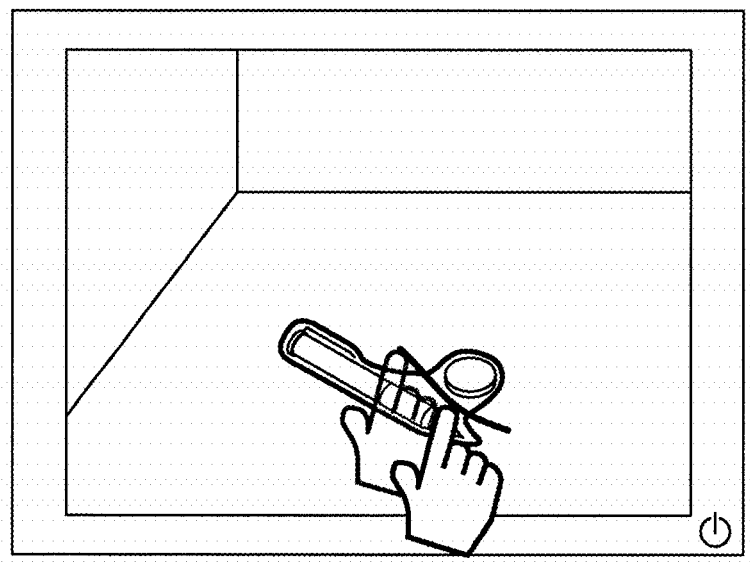
FIG. 10 is a diagram illustrating a state in which the user specifies a boundary line that separates the pen, which is the object to be held, from another object in the contour including the plurality of objects.

In the latter method, the user specifies, as the second specification, a boundary line between a plurality of objects in the contour that has been extracted by the robot apparatus 100 and that includes the plurality of objects. FIG. 9 illustrates an extracted contour that includes the pen, which is the object to be held, and, by mistake, an eraser beside the pen. In such a case, as illustrated in FIG. 10, the user specifies a boundary line that separates the pen, which is the object to be held, from another object in the contour including the plurality of objects.

FIG. 5B illustrates an example of a communication sequence at a time when, in the processing in S5108 of the instruction terminal 200, the user has not approved the contour of the object extracted on the basis of the first specification.

If the user does not approve the contour in the processing in S5108, the instruction terminal 200, again, waits for an input from the user to the input unit 414 (S5111).

The user specifies, through the input unit 414, a boundary line between the objects in the contour including the object to be held extracted by the robot apparatus 100. That is, as illustrated in FIG. 10, the user draws, with his/her finger, a boundary line that separates the pen, which is the object to be held, from another object in the contour including the plurality of objects (S5112).

When the user has input specification information indicating the boundary line between the objects to the input unit 414 (S5113), the instruction terminal 200 transfers the specification information to the robot apparatus 100 through the communication unit 411. In the robot apparatus 100, the image processing unit 422, again, extracts contours of the objects at the left and right of the specified boundary line, and feeds contour information regarding the left and right objects back to the instruction terminal 200 along with the captured image (S5211).

Figure 11A:
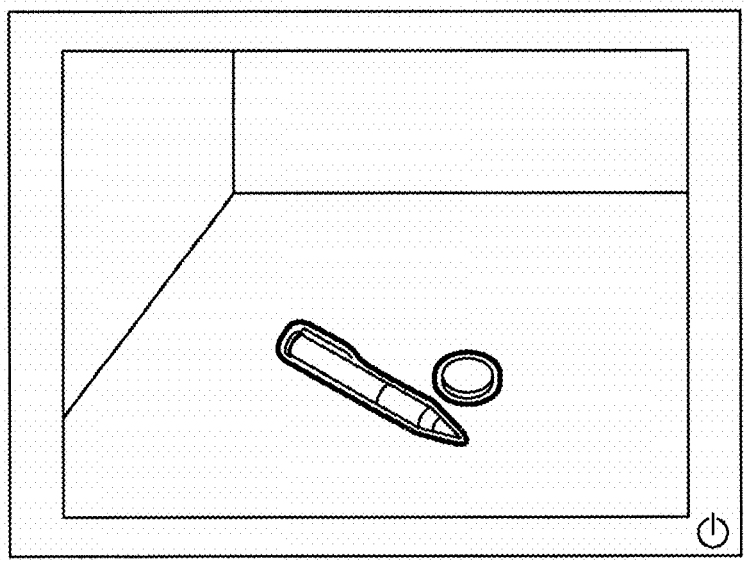
FIG. 11A is a diagram illustrating a state in which contours obtained by separating the pen, which is the object to be held, from the eraser beside the pen are superimposed upon the captured image displayed on the display screen.

In the instruction terminal 200, the output unit 413 displays the contours of the objects transferred again on the display screen thereof (S5114). FIG. 11A illustrates a state in which the contours obtained by separating the pen, which is the object to be held, from the eraser beside the pen are superimposed upon the captured image displayed on the display screen.

Figure 11B:
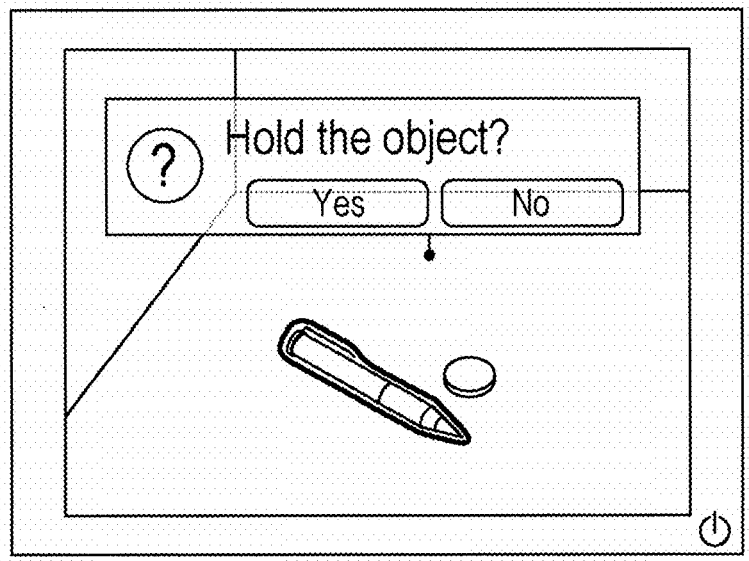
FIG. 11B is a diagram illustrating a dialog for determining whether to perform the holding operation on the object to be held on the basis of the displayed contour information.

The instruction terminal 200 then waits until the user determines which of the objects is to be held (S5115). The user selects the object to be held on the display screen on which the contours of the objects are displayed by the output unit 413 again (S5116). As a result, as illustrated in FIG. 11B, only the contour of the selected object remains (in the example illustrated in FIG. 11B, only the contour of the pen, which has been selected, remains and the contour of the eraser is removed), and a dialog box for determining whether or not the user approves or permits the holding operation performed by the robot apparatus 100 is displayed. In the illustrated dialog box, a message "Hold the object?" is displayed along with buttons "Yes" and "No". In the instruction terminal 200, if the user approves the detailed contour of the object extracted by the robot apparatus 100 by, for example, selecting "Yes" in the dialog box (S5117), the instruction terminal 200 instructs the robot apparatus 100 to hold the object to be held through the communication unit 411.

In the robot apparatus 100, when the communication unit 421 has received the execution instruction, the holding planning unit 426 estimates the position and the attitude of the object to be held from the extracted contour on the basis of the relationship between the camera coordinate system and the world coordinate system of the image pickup unit 423 (S5212). However, details of the process for estimating the position and the attitude of the object to be held will be described later.

Thereafter, the holding planning unit 426 determines the attitude of the holding unit 428 at a time when the holding unit 428 holds the object to be held on the basis of the position and the attitude of the object to be held estimated in S5203 (S5204), and the holding control unit 427 controls the operation of the holding unit 428 in accordance with the trajectories planned by the holding planning unit 426 to realize the holding of the object (S5205) (as described above).

Finally, the process in S5203 and S5212 for estimating the position and the attitude of the object to be held from the contour specified in the captured image will be described with reference to FIG. 12. However, a coordinate transformation expression between the world coordinate system and the camera coordinate system is assumed to be determined.

Figure 12:
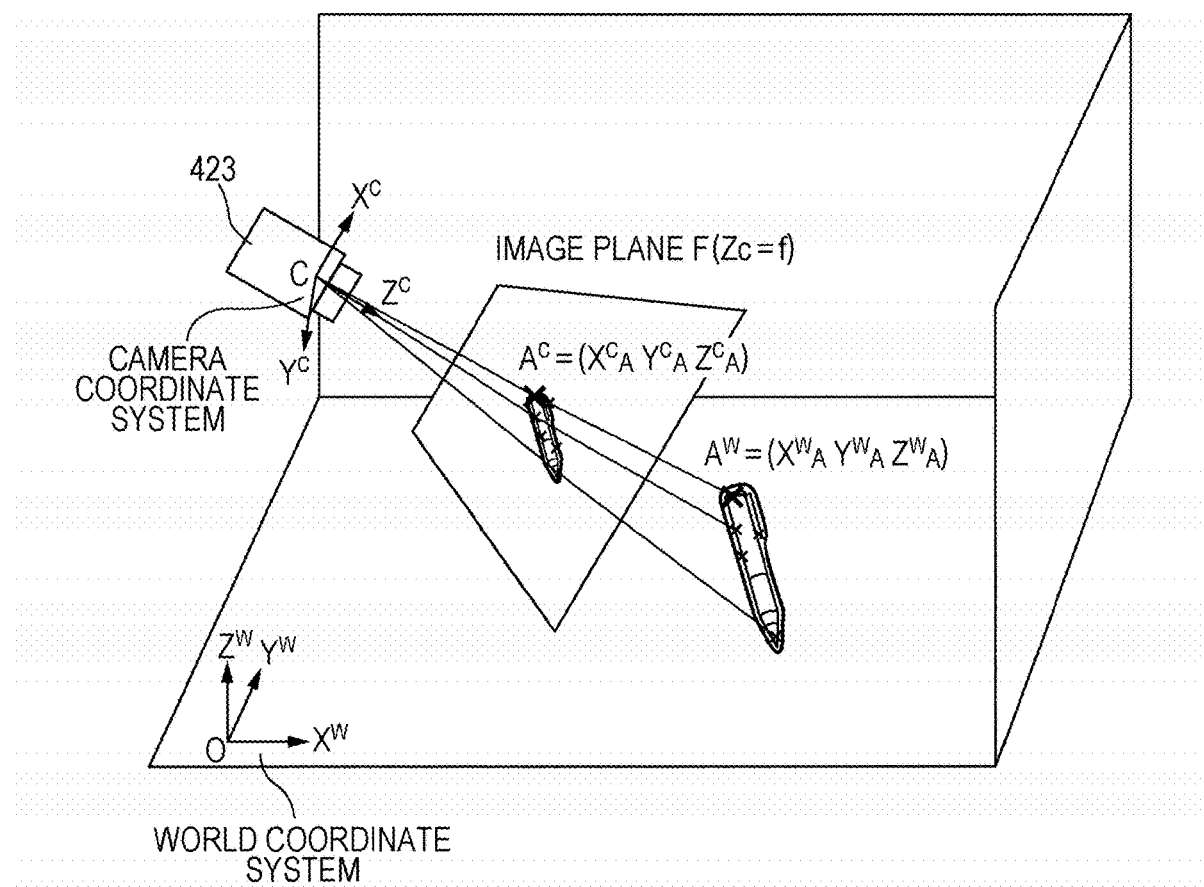
FIG. 12 is a diagram illustrating a process for estimating the position and the attitude of the object to be held from a specified contour in a captured image.

As described in FIG. 12, the world coordinate system is denoted by $(X^W, Y^W, Z^W)$, and the camera coordinate system is denoted by $(X^C, Y^C, Z^C)$. A contour in a captured image can be regarded as a group of points $A^C (X_A^C, Y_A^C, Z_A^C)$ on an image plane, that is, a plane $Z^C = f$ located a focal distance f away from an origin C of the camera coordinate system.

Equations of lines that pass through the origin C and the group of points $A^C$ on the image plane are obtained. Next, a group of points $A^W (X_A^W, Y_A^W, Z_A^W)$ at which the equations of the lines and the object to be held intersect are obtained in the world coordinate system. The group of points $A^W$ $(X_A^W, Y_A^W, Z_A^W)$ represent the contour of the object to be held in the world coordinate system, and therefore the position and the attitude of the object to be held are represented.

As described above, according to the present embodiment, the robot apparatus 100 can hold various objects on the basis of specification of approximate regions including objects to be held by the user without registering such objects in advance. In particular, minute objects and thin objects, which are difficult to automatically recognize, can be recognized in an environment and the holding operation can be properly performed on the basis of a smaller number of times of specification by the user.

The user can inform the robot apparatus 100 which object is to be held through a simple operation for specifying an approximate contour of an object using the instruction terminal 200, and therefore anyone can perform the specification operation simply and quickly.

In addition, in the present embodiment, even when the object to be held is an object that is difficult to recognize just by specifying an approximate region including the object, the user can cause the robot apparatus 100 to recognize the object to be held by specifying a boundary between a plurality of objects in a contour that has been recognized by mistake and that includes the plurality of objects.

The technology disclosed herein may have the following configurations.

(1) A robot apparatus including an output unit that displays an image including an object on a screen, an input unit that receives an operation performed by a user for specifying information relating to an approximate range including the object in the image, an object extraction unit that extracts information regarding a two-dimensional contour of the object on the basis of the specification received by the input unit, and a position and attitude estimation unit that estimates information regarding a three-dimensional position and attitude of the object on the basis of the information regarding the two-dimensional contour.

(2) The robot apparatus according to (1), further including an image pickup unit. The output unit displays an image captured by the image pickup unit on the screen.

(3) The robot apparatus according to (1), further including a holding unit, a holding planning unit that plans a trajectory of the holding unit for holding the object on the basis of the estimated information regarding the three-dimensional position and attitude of the object, and a holding control unit that controls a holding operation for the object performed by the holding unit in accordance with the planned trajectory.

(4) The robot apparatus according to (1). A terminal device including the output unit and the input unit performs wireless communication with the robot apparatus including the holding unit.

(5) The robot apparatus according to (1). The input unit is a touch panel integrated into the screen of the output unit. The user specifies the approximate range including the object by touching the touch panel.

(6) The robot apparatus according to (5). The user specifies the range including the object by drawing a region surrounding the object in the captured image displayed on the touch panel.

(7) The robot apparatus according to (5). The user specifies the range including the object by touching substantially a center of the range including the object in the captured image displayed on the touch panel, while providing a radius of the range using a period for which the user touches substantially the center of the range.

(8) The robot apparatus according to (5). The user specifies the range including the object by drawing a diagonal of a rectangular region surrounding the object in the captured image displayed on the touch panel.

(9) The robot apparatus according to (1). The output unit displays the information regarding the two-dimensional contour of the object extracted by the object extraction unit on the screen. A holding operation for the object is performed when the user has approved the information regarding the two-dimensional contour through the input unit.

(10) The robot apparatus according to (9). When the user has not approved the information regarding the two-dimensional contour, the input unit receives second specification from the user. The object extraction unit extracts the information regarding the two-dimensional contour of the object again on the basis of the second specification.

(11) The robot apparatus according to (10). The input unit receives the information relating to the approximate range including the object again as the second specification.

(12) The robot apparatus according to (10). The input unit receives, as the second specification, additional specification for the approximate range including the object specified first.

(13) The robot apparatus according to (10). The input unit receives, as the second specification, specification of a boundary line between a plurality of objects included in the approximate including the object specified first. The object extraction unit extracts information regarding two-dimensional contours of objects from both sides of the boundary line and the output unit displays the extracted information regarding the two-dimensional contours of the objects on the screen. The holding operation for the object is performed when the user has selected an object to be held and approved the information regarding the two-dimensional contours through the input unit.

(14) A method for controlling a robot apparatus, the method including displaying an image including an object on a screen, receiving an operation performed by a user for specifying information relating to an approximate range including the object in the image, extracting information regarding a two-dimensional contour of the object on the basis of the specification received in the inputting, and estimating information regarding a three-dimensional position and attitude of the object on the basis of the information regarding the two-dimensional contour.

(15) A computer program described in a computer-readable form, the computer program causing a computer to function as an apparatus including an output unit that displays an image including an object on a screen, an input unit that receives an operation performed by a user for specifying information relating to an approximate range including the object in the image, an object extraction unit that extracts information regarding a two-dimensional contour of the object on the basis of the specification received by the input unit, and a position and attitude estimation unit that estimates information regarding a three-dimensional position and attitude of the object on the basis of the information regarding the two-dimensional contour.

It should be understood by those skilled in the art that various modifications, combinations, sub-combinations and alterations may occur depending on design requirements and other factors insofar as they are within the scope of the appended claims or the equivalents thereof.

What is claimed is:

1. A movable apparatus comprising:
    circuitry configured to:
        transfer, to a user device, an image captured by a camera attached to the movable apparatus;
        receive specification information input based on the image;
        extract two-dimensional feature information regarding an object in the image based on the specification information; and
        estimate a three-dimensional position of the object using the two-dimensional feature information.

2. The movable apparatus of claim 1, wherein the circuitry is configured to:
    execute a holding process based on the three-dimensional position of the object.

3. The movable apparatus of claim 1, wherein the specification information indicates region information including the object.

4. The movable apparatus of claim 1, wherein the two-dimensional feature information includes a contour of the object.

5. The movable apparatus of claim 4, wherein the circuitry is configured to:
    transfer the two-dimensional feature information to the user device.

6. The movable apparatus of claim 5, wherein the circuitry is configured to:
    receive the specification information indicating a boundary of objects based on the two-dimensional feature information.

7. The movable apparatus of claim 6, wherein the circuitry is configured to:
    extract the two-dimensional feature information based on the specification information indicating the boundary of the objects.

8. The movable apparatus of claim 7, wherein the circuitry is configured to:
    estimate the three-dimensional position of the object based on the two-dimensional feature information based on the specification information indicating the boundary of the objects.

9. The movable apparatus of claim 8, wherein the circuitry is configured to:
    execute a holding process based on the three-dimensional position of the object based on the two-dimensional feature information based on the specification information indicating the boundary of the objects.

10. The movable apparatus of claim 1, wherein the specification information is input by a user.

11. A method for controlling a movable apparatus, the method comprising:
    transferring, to a user device, an image captured by a camera attached to the movable apparatus;
    receiving specification information input based on the image;
    extracting two-dimensional feature information regarding an object in the image based on the specification information; and
    estimating a three-dimensional position of the object using the two-dimensional feature information.

12. The method of claim 11, further comprising:
    executing a holding process based on the three-dimensional position of the object.

13. The method of claim 11, wherein the specification information indicates region information including the object.

14. The method of claim 11, wherein the two-dimensional feature information includes a contour of the object.

15. The method of claim 14, further comprising:
    transferring the two-dimensional feature information to the user device.

16. The method of claim 15, further comprising:
    receiving the specification information indicating a boundary of objects based on the two-dimensional feature information.

17. The method of claim 16, further comprising:
    extracting the two-dimensional feature information based on the specification information indicating the boundary of the objects.

18. The method of claim 17, further comprising:
    estimating the three-dimensional position of the object based on the two-dimensional feature information based on the specification information indicating the boundary of the objects.

19. The method of claim 18, further comprising:
    executing a holding process based on the three-dimensional position of the object based on the two-dimensional feature information based on the specification information indicating the boundary of the objects.

20. The method of claim 11, wherein the specification information is input by a user.

* * * * *